April 30, 1940.　　　　　I. J. KUERT　　　　　2,198,825
LID HOLDER
Filed March 14, 1939
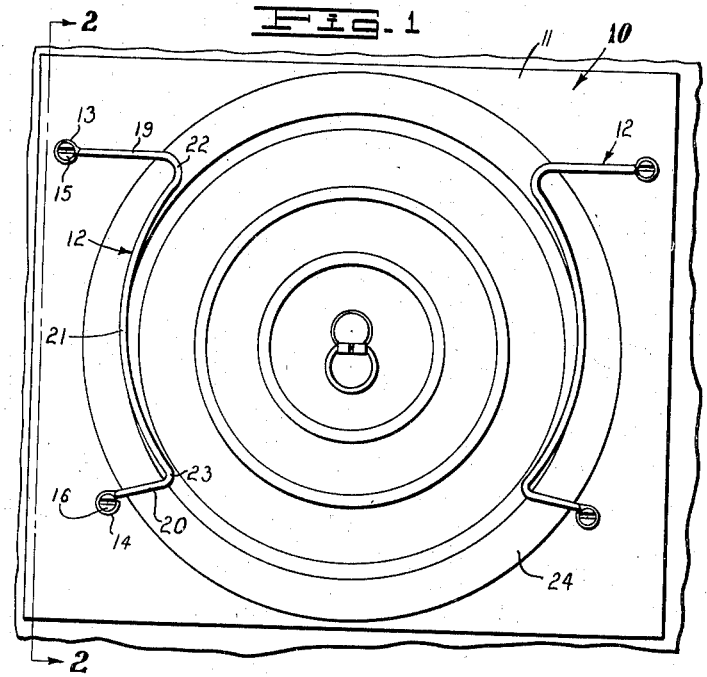
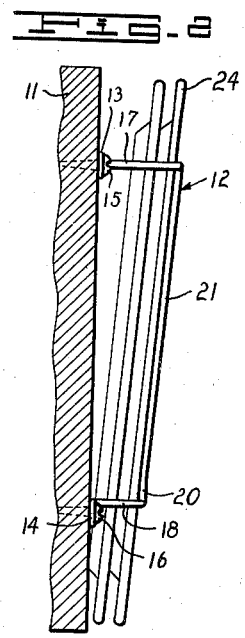
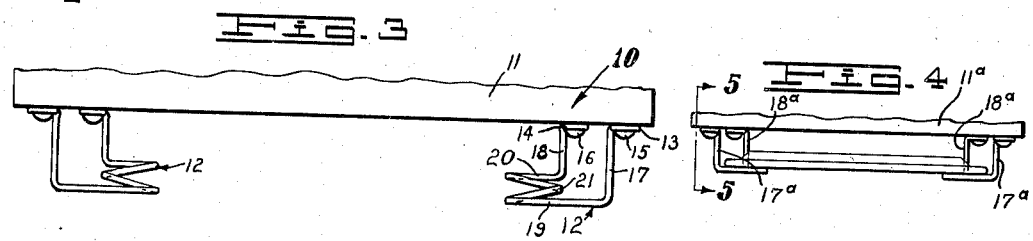
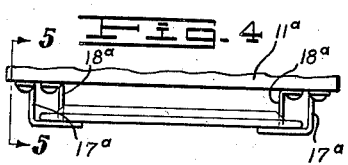
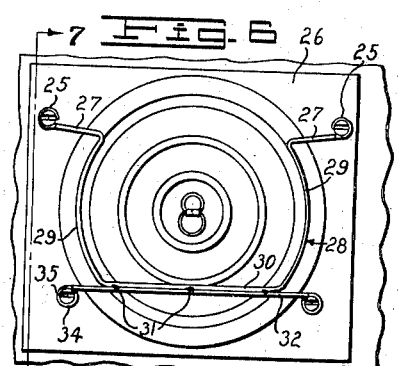
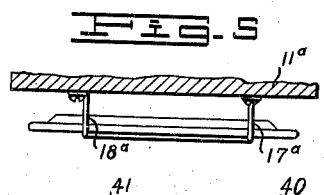
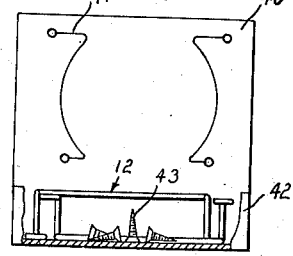
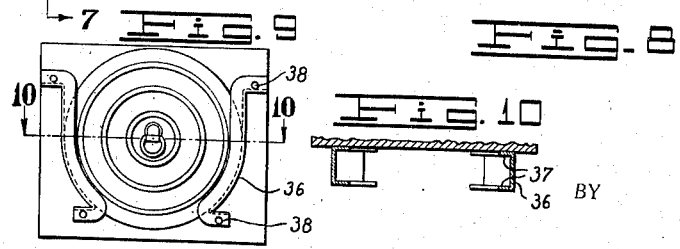
INVENTOR.
IRA J. KUERT
ATTORNEY.

Patented Apr. 30, 1940

2,198,825

UNITED STATES PATENT OFFICE 2,198,825

LID HOLDER

Ira J. Kuert, Los Angeles, Calif.

Application March 14, 1939, Serial No. 261,686

3 Claims. (Cl. 211—41)

This invention relates to lid supports.

The general object of the invention is to provide a novel lid support comprising a pair of spaced, opposed, lid engaging members so mounted in spaced relation as to support a lid.

A more specific object of the invention is to provide a lid support which is adapted for use beneath cup-boards, shelves, etc., or on walls or alongside of kitchen cabinets, etc., and wherein the support is so constructed that it may be installed in either a vertical or horizontal position and will allow the lids to be normally out of the way and yet readily accessible.

Other objects and advantages of this invention will be apparent from the following description taken in connection with the accompanying drawing, wherein:

Fig. 1 is a front elevation showing a lid support embodying the features of my invention;

Fig. 2 is a fragmentary sectional view taken on line 2—2, Fig. 1;

Fig. 3 is a top plan view of the lid support;

Fig. 4 is a front elevation on a reduced scale and mounted horizontally showing a modification;

Fig. 5 is a sectional view taken on line 5—5, Fig. 4;

Fig. 6 is a front elevation of a further modification;

Fig. 7 is a section taken on line 7—7, Fig. 6;

Fig. 8 is a top plan view showing an unwrapped package adapted to contain the lid support;

Fig. 9 is a view similar to Fig. 1 showing a modification of my invention; and

Fig. 10 is a section taken on line 10—10, Fig. 9.

Referring to the drawing by reference characters I have shown my invention as embodied in a lid holder which is indicated generally at 10. As shown the lid holder is mounted on a base 11 and includes a pair of members 12.

The members 12 are similar to each other and each is preferably made of a single length of wire and includes looped portions 13 and 14 which are shown as secured to the base by screws 15 and 16 respectively. From the looped portions the wire is extended as at 17 and 18 perpendicular to the base member and these portions 17 and 18 merge into lid engaging portions 19 and 20 which are preferably parallel to the base member.

The portions 19 and 20 are connected to an intermediate curved member 21 by curved portions 22 and 23. As shown in the drawing in Figs. 1, 2 and 3 the portion 19 is longer than the portion 20 and the portion 17 is longer than the portion 18 so that when the device is arranged as shown in Fig. 2 on a vertically arranged base the top of the intermediate portion 21 is spaced farther from the base than is the bottom thereof.

In use the parts are assembled as shown in Fig. 1 and a plurality of lids 24 are inserted as shown in Fig. 1. The lids contact the portions 19 and are prevented from falling by engagement with the portions 18. One or more lids may be inserted and the construction is such that quick insertion of the lids and ready removal is secured.

In Fig. 4 I show a modification of my invention wherein the portions 17A which are similar to the portions 17 previously described are equal in length with the portions 18A which are similar to the portions 18 described and in this modification the base 11A is preferably arranged beneath a base or other support so that the lids are positioned horizontally when they are in place.

In Figs. 6 and 7 I show a modification of my invention wherein the support includes a single length of wire having a loop 25 at each end secured upon a base 26. From the looped portions 25 the wire is extended as at 25' perpendicular to the base 26. From the portions 25' horizontal portions 27 extend and are joined to a U-shaped intermediate portion 28 which includes arcuate sides 29 and a cross member 30.

The cross member 30 is spot welded as at 31 to a lower member 32 which extends parallel to the base and which includes portions 33 perpendicular to the base. The portions 33 have loops 34 secured as by screws 35 to the base. The operation of the device shown in Fig. 6 is similar to that of the other types previously described.

In Figs. 9 and 10 I have shown a modification of my invention wherein the support 36 is shown as made of sheet metal bent to U-shape and curved to accommodate one or more lids between the flanges 37. This modified support is held in place by suitable fastening means 38.

In describing my invention as applied to a base member it will be understood that this base member may be separately formed and secured in place or may be integral with a built in shelf of another member.

To facilitate attachment of my supports I have devised an improved package indicated in Fig. 8 which as shown includes a cardboard or paper wrapper 40 having marks 41 thereon to indicate the positions to be taken by the support members. The wrapper 40 includes a bottom flap 42 in which the supports 12 are arranged as are the attaching screws indicated at 43. The package is wrapped by rolling the wrapper and is delivered in this fashion to the purchaser who uses the marked portions 41 as a guide in assembling the support.

From the foregoing description it will be apparent that I have invented a novel support which can be very economically manufactured and which is highly efficient for the intended purpose.

Having thus described my invention I claim:

1. In a lid support, a member comprising a length of wire having a loop at each end thereof adapted to receive fastening means, said support adjacent each loop having a portion extending at right angles to the adjacent loop, said last mentioned portions each having a portion extending therefrom parallel to the loop, and an intermediate portion connected to said pair of parallel portions, said intermediate portion being arcuate and joined to the parallel portions by curved portions, the parallel portion at one end being shorter than the parallel portion at the other end, said support being adapted to cooperate with a similar symmetrically formed member with the members mounted so that the lower ends are closer together than the upper ends.

2. In a lid support, a base member, a pair of opposed supports, each of said supports comprising a length of wire having an apertured portion at each end thereof, fastening means passing through said apertures and secured to the base member, each of said supports adjacent each aperture having a portion extending at an angle to the base member, said last mentioned portions each having a lid engaging portion extending therefrom at an angle thereto, and an intermediate portion connecting the lid engaging portions, said intermediate portion being arcuate and joined to the lid engaging portions by curved portions, the lid engaging portions at the lower end being shorter than the lid engaging portions at the top end, said apertures at the bottom being closer together than at the top.

3. In a lid support, a base member, a pair of opposed supports, each of said supports comprising a length of wire having a loop at each end thereof, fastening means passing through said loops and secured to the base member, each of said supports adjacent each loop having a portion extending at right angles to the base member, said last mentioned portions each having a portion extending therefrom parallel to the base member, and an intermediate portion connected to each pair of parallel portions, said intermediate portion being arcuate and joined to the parallel portions by curved portions, the parallel portions at the bottom end being shorter than the parallel portions at the top end, said loops at the bottom being closer together than at the top.

IRA J. KUERT.